March 7, 1961 J. C. HARTLEY 2,973,956
NON-VERTICAL AIR-FLOATED INDEXING FIXTURE
Filed Nov. 12, 1958 2 Sheets-Sheet 2
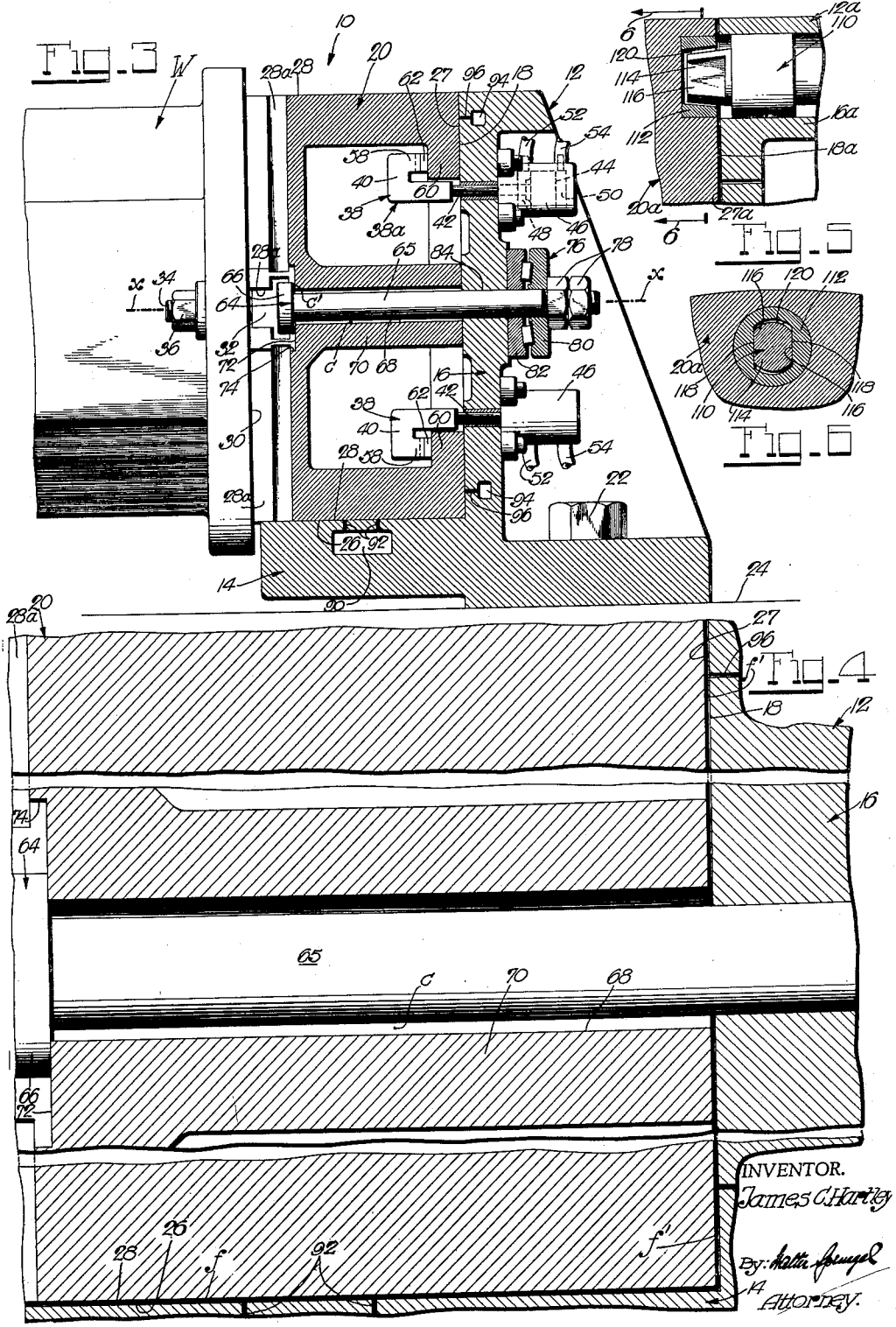
INVENTOR.
James C. Hartley
By: [signature]
Attorney

United States Patent Office 2,973,956
Patented Mar. 7, 1961

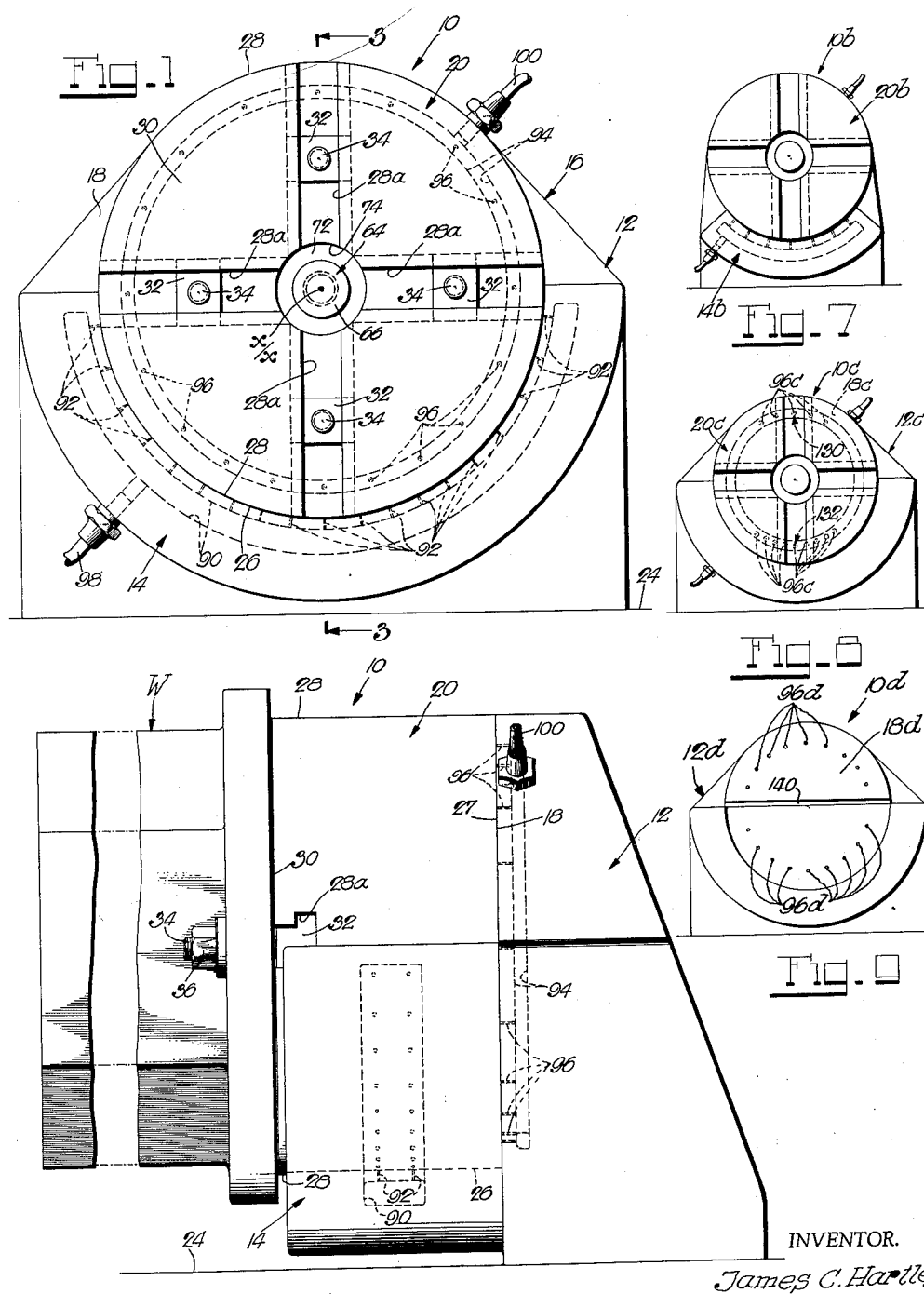

2,973,956

NON-VERTICAL AIR-FLOATED INDEXING FIXTURE

James C. Hartley, Branford, Conn., assignor to Union Manufacturing Company, New Britain, Conn., a corporation of Connecticut Filed Nov. 12, 1958, Ser. No. 773,316

6 Claims. (Cl. 269—133)

This invention relates generally to air-floated work indexing fixtures, and more particularly to air-floated indexing fixtures with non-vertical rotary axes.

The type of indexing fixture with which the present invention is concerned comprises an indexing table with a non-vertical rotary axis which is adapted to carry on one of its opposite faces a work load for maximum operational exposure of the latter, with the indexing table being centered and supported at its periphery in an outer fixed bearing or track, and being retained with its other face against a fixed backing surface to prevent tilting of the indexing table under its lopsided work load. Indexing fixtures of this type are used to good advantage for many operations on work. However, while these prior fixtures are satisfactory in many respects, they are deficient in a few important respects. Thus, the rotary tables of prior fixtures of this type encounter on their indexing steps considerable frictional resistance in any event in their outer bearing supports and also on their backing surfaces, and such frictional resistance becomes rapidly excessive or even prohibitive with larger work loads. As a result, prior fixtures of this type not only require a force of unduly large magnitude for indexing their rotary tables, but their operating parts are subjected to rapid and excessive wear, so much so that the accurate performance of these prior fixtures is soon adversely affected and their useful life unduly shortened. On the other hand, the provision of elaborate antifriction bearings in indexing fixtures of this type not only increases the cost of the latter unduly, but the severe one-sided load forces on these antifriction bearings subject the latter to rapid and excessive wear.

It is the primary aim and object of the present invention to provide an indexing fixture of this type which has none of the aforementioned deficiencies of the prior fixtures.

Thus, it is among the objects of the present invention to provide an indexing fixture of this type of which the rotary table is peripherally supported and rearwardly backed for its firm overall support, accurate location and secure arrest in any angular position for the performance of any operation on any work load thereon, yet its indexing motion meets with immeasurably less frictional resistance than heretofore and, hence, requires a correspondingly smaller indexing force, thereby also greatly reducing wear of the operating parts of the fixture and preserving the accurate performance of the latter indefinitely.

It is another object of the present invention to provide an indexing fixture of this type of which the rotary table is for each indexing step thereof air-floated on its peripheral bearing support or surface as well as on its rear backing surface so that the indexing of this table into successive angular position meets with virtually no frictional resistance from these surfaces, thereby permitting the indexing of the table with the least possible force, and even manual force, despite the magnitude of the work load thereon, subjecting the customary locating pin or pins to virtually no wear on their frequent projection into successive locating apertures in the table, and practically eliminating wear of the table and of its bearing support and backing surface.

It is a further object of the present invention to provide an indexing fixture of this type in which the rotary table is air-floated on its peripheral bearing support and rear backing surface for its virtually unresisted indexing into successive positions, as aforementioned, yet the table is, for any operation on work thereon, not only accurately located by its bearing support and rear backing surface by being fully seated in the former and uniformly backed against the latter, but also securely arrested in any angular position by being firmly held to its bearing support and backing surface.

Another object of the present invention is to provide an indexing fixture of this type in which the rotary table is during its indexing periods air-floated peripherally and at its rear, as aforementioned, and the table is held against endwise movement from its backing surface with sufficient freedom, however, to be air-floated thereon and on its bearing support on the one hand, and on termination of its air-float to gravitate into seating engagement with its bearing support and be drawn firmly against its backing surface on the other hand. With this arrangement, the advantageous accurate location of the rotary table on, and its secure arrest in any angular position to, the fixed bearing support and backing surface for the performance of any operation on the work thereon are achieved fully and without any interference with the air-float of the table for indexing purposes which besides other important advantages also eliminates to all practical intents and purposes wear of the very surfaces which accurately locate the table. Moreover, this arrangement readily lends itself to the use of a bearing support which may extend over no more than half, and may well extend over considerably less than half, the peripheral extent of the table with resultant savings in cost of the fixture, reduced bulk of the same and economic consumption of purchased compressed air for the air-lift of the table, as well as accessibility to the table periphery for cleaning purposes to keep the air-float intact.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a front view of an indexing fixture embodying the present invention;

Fig. 2 is a side view of the same fixture carrying a work load;

Fig. 3 is a longitudinal section through the fixture as taken on the line 3—3 of Fig. 1;

Fig. 4 is an enlarged fragmentary longitudinal section through a part of the fixture;

Fig. 5 is an enlarged fragmentary section through a part of an indexing fixture embodying the present invention in a modified manner;

Fig. 6 is a fragmentary section taken on the line 6—6 of Fig. 5;

Fig. 7 is a front view at a reduced scale of an indexing fixture embodying the present invention in another modified manner;

Fig. 8 is a front view at a reduced scale of an indexing fixture ambodying the present invention in a further modified manner; and Fig. 9 is a front view at a reduced scale of an indexing fixture without the indexing table and embodying the present invention in still another modified manner.

Referring to the drawings, and more particularly to Figs. 1 to 3 thereof, the reference numeral 10 designates a workholder or indexing fixture which has as its main components a frame 12 providing a bearing support 14 and an upright member or section 16 with a surface 18 at its front, and a table 20 which is rotatable on the bearing support 14 and backed against the surface 18 and has provisions for releasably carrying a work load W.

The frame 12 is presently bolted at 22 to any suitable support 24 (Fig. 3), and its bearing support 14 is provided with a bearing surface 26 on which the table 20 is normally seated and thereby centered. The bearing surface 26 extends circularly, and in this instance partcircularly, about a non-vertical axis, presently a substantially horizontal frame axis x—x which is the reference axis for work on the table 20. The machined backing surface 18 extends in a plane normal to the frame or reference axis x—x, and is adapted to be uniformly engaged by the rear face 27 of the table 20 when the latter is seated on the bearing surface 26, as more fully described hereinafter.

The table 20 has a rotary axis which coincides with the reference axis x—x when the table is seated on the bearing surface 26. More particularly, the table 20 is thus seated on the bearing surface 26 with its machined periphery 28 which presently is annular throughout about its rotary axis, so that the table 20 may be turned on the bearing surface 26 in either direction into any angular position thereon in a manner described hereinafter. Since the backing surface 18 extends in a plane normal to the reference axis x—x and is uniformly engaged by the rear face 27 of the table 20 when the latter is seated on the bearing surface 26, as aforementioned, it follows that the rear face 27 of the table must extend in a plane normal to the rotary axis of the latter. The aforementioned provisions on the table 20 for releasably carrying the work load W thereon comprise, in the present instance, a plurality of radial T-slots 28a, presently four, in the front face 30 of the table, and sliding blocks 32 therein having projecting studs 34 which presently extend through a rear flange of the exemplary work load W and receive nuts 36 for releasably but firmly retaining the work load on the table. The front face 30 of the table 20 presently also extends in a plane normal to the rotary axis of the latter.

In the normal use of the present indexing fixture 10, its table 20 with the one-sided work load W thereon is intermittently indexed into successive angular stop positions in which certain operations may be performed on the work. To this end, the table 20 must be free to turn for its intermittent indexing steps, and must be arrested against rotation in its stop positions. Thus, an arresting device 38, and in this instance two arresting devices 38 (Fig. 3), are provided which are operative firmly to hold or lock the table 20 in any of its angular stop positions to the frame 12, and to release the table for each of its indexing steps. The exemplary arresting devices 38 are presently identical in every respect, each comprising a clamping member 40 on the rod 42 of a plunger 44 in a presently double-acting cylinder 46 on the frame 12 the opposite cylinder ends 48 and 50 of which are connected through conduits 52 and 54 with a suitable control valve (not shown) which, in turn, is connected with a suitable source of fluid under pressure, such as compressed air, for example. Thus, on actuating this control valve, either manually or automatically, into one position, the same will admit compressed air into the ends 48 of the cylinders 46 and simultaneously vent the opposite ends 50 thereof, with the result that the clamping members 40 close on the table 20 (Fig. 3) and firmly draw the same with its rear face 27 against the backing surface 18 with sufficient force to prevent rotation of the table while the work W thereon is being operated on. Conversely, on activating this control valve into its other position, the same will admit compressed air into the ends 50 of the cylinders 46 and simultaneously vent the opposite ends 48 thereof, with the result that the clamping members 40 retract from the table 20 and thereby release the same for an indexing step. The clamping members 40 are presently U-shaped, having legs 58 with which to engage an inward flange 60 at the rear of the table 20 for clamping the rear face 27 of the latter against the backing surface 18. Preferably, the clamping legs 58 of the members 40 carry pads 62 of any suitable friction material with which to bear against the table flange 60.

Provisions are made to retain the table 20, despite its lop-sided work load W, seated on the bearing surface 26 when the clamping devices 38 release the table for an indexing step. To this end, a retaining device 64 (Fig. 3) comprises, in the present instance, a rod 65 on the frame 12 having a table-retaining end collar 66. The rod 65 projects forwardly from the upright frame section 16 through an aperture 68 in a central hub 70 of the table 20, and its end collar 66 confronts the bottom 72 of a central recess 74 in the front face 30 of the table. The rod 65, which passes with considerable clearance c through the hub 70 of the table 20 (Fig. 3 and 4), is presently rotatably carried by the frame 12 through intermediation of an antifriction-type thrust bearing 76. To this end, the rod 65 is by means of nuts 78 held against forward movement on the rear race 80 of the thrust bearing 76 the front race 82 of which bears against the rear of the upright frame section 16. The rod 65 with its end collar 66 thus holds the table 20 to the frame 12, and is free to turn with the table with a minimum of frictional resistance, when the table is indexed on its release from the clamping devices 38. The rod 65 may be journalled at 84, preferably somewhat loosely, in the upright frame section 16 so that its axis will be substantially coincident with the reference axis x—x.

In accordance with an important aspect of the present invention, the table 20 is for each of its intermittent indexing steps air-floated on the bearing surface 26 as well as on the backing surface 18, so that the table encounters to all practical intents and purposes no frictional resistance from these surfaces despite the lop-sided work load W. To this end, the bearing support 14 is provided, presently substantially throughout its arcuate extent, with an inner air chamber 90 which through a multiplicity of very small holes or orifices 92 communicates with the bearing surface 26. To the same end also, the upright frame section 16 is provided with a presently endless inner air chamber 94 which through a multiplicity of very small holes or orifices 96 communicates with the backing surface 18. The air chambers 90 and 94 are through conduits 98 and 100 connected with suitable shut-off valves (not shown), and may be connected with a single shut-off valve, in communication with a suitable supply of compressed air.

In the operation of the present indexing fixture 10 and while the work W on the table 20 is subjected to an operation, the shut-off valve just mentioned is closed so that no compressed air reaches the bearing and backing surfaces 26 and 18 of the frame 12, and the table 20 is fully seated on the bearing surface 26 and held in firm and uniform engagement with the backing surface 18 by the closed clamping devices 38 (Fig. 3). After the present operation on the work W is completed, the table 20 will next be indexed into a new angular stop position in which the next operation will be performed on the work W. Before indexing the table 20, however, the clamping devices 38 are opened in the before-described manner to release the table for rotation, and the aforementioned shut-off valve is opened to admit compressed air into the chambers 90 and 94 and thence through the orifices 92 and 96 to the bearing surface 26 and backing surface 18, there to air-float the table. The table 20 is then indexed while the shut-off valve is kept open to sustain the air-float of the table to the end of its indexing step. The shut-off valve is then closed to terminate the air-float of the table 20, so that the latter becomes by gravity reseated on the bearing surface 26 and, hence, also accurately recentered thereby. The clamping devices 38 may be closed at about the same time so that the table 20 will with its rear face 27 be firmly drawn into engagement, and more particularly into uniform engagement, with the backing surface 18, with the result that the table will axially be correctly oriented with the reference axis x—x, i.e., the table will with its rotary axis be returned into exact coincidence with this reference axis x—x. Additional operations on the work W, with intermittent indexing steps of the table 20 in the aforementioned air-floated fashion, are undertaken until all intended operations have been performed on the work, whereupon the latter is removed from the table and new work mounted thereon.

To achieve an adequate air-float of the loaded table 20 on the bearing surface 26 and backing surface 18 for virtually frictionless indexing of the table and its lopsided work load W thereon, it is imperative that the air films f and f' (Fig. 4) between the bearing surface 26 and table periphery 28 and between the backing surface 18 and rear table face 27, respectively, have sufficiently high integrals of pressure to keep the respective mating surfaces 26, 28 and 18, 27 separated. This may be achieved with relatively low pressures of the admitted air in the chambers 90 and 94 which through the orifices 92 and 94 supply the air films f and f', respectively. Thus, it has been found that the usual compressed air available in most plants is fully adequate for this intended purpose without requiring an undue number of orifices 92 and 94 which, moreover, may be minute in cross-section, thereby to keep the consumption of compressed air for the air-float of the table and its work load at a minimum. In this connection, it should be kept in mind that an air film of minimum thickness for the barest separation of the mating surfaces is entirely adequate for the purpose. Thus, the separation of these mating surfaces due to the air-float of the table 20 may well be so infinitely small as to be imperceptible except for the readily perceptible disappearance of friction between them when the table responds to an applied turning force of remarkably low magnitude in any event and which at its maximum need merely overcome the inertia of the table with its work load and such slight friction as occurs in the table-retaining device 64 in order to set the table in motion.

For the reasons just explained, the air films f and f' in Fig. 4 are obviously shown of exaggerated thickness so as to be at all demonstrable. It follows, therefore, that whatever lift of the loaded table 20 on the bearing surface 26 occurs by virtue of its air-float thereon, such lift of the table is so infinitely small as neither to be resisted by, nor in any way interfere with the designated function of, the table-retaining device 64. It further follows that, like the exaggerated thickness of the air film f' between the backing surface 18 and the rear table face 27 in Fig. 4, the clearance c' between the rod collar 66 and the table 20 in the clamped condition of the latter is shown exaggerated in Fig. 3 in order to be at all demonstrable. Accordingly, while due to its airfloat the table 20 is definitely separated from the bearing surface 26 and backing surface 18, such separation of the table from these surfaces is so infinitely small that in the interim between each termination of the air-float of the table and its secure lock to the backing surface 18 the twisting or cocking forces in the table by virtue of the lop-sided work load of any magnitude thereon cannot exert themselves to subject either the table-retaining device 64 to any appreciable stress or wear, or the tablelocating surfaces to any appreciable wear.

In order most effectively to counteract during operations on the work W any tilting tendencies of the loaded table 20 on the bearing surface 26, the clamping devices 38 are preferably arranged in diametrically and vertically aligned fashion on the frame 12 so that the top device 38a (Fig. 3) will have optimum leverage in drawing the table firmly against the backing surface 18. The table 20 may be indexed by a power drive which is not shown as it forms no part of the present invention. Moreover, it is entirely feasible to index the table 20 with its work load W of most any magnitude by hand in view of the negligble resistance encountered due to the air-float of the table, as aforementioned. If desired, the frame 12 and the table 20 may also be provided with a suitable graduated index and coordinated pointer (neither shown) to facilitate the indexing of the table into certain predetermined stop positions required for the operations to-be-performed on work thereon.

The present indexing fixture also lends itself to accurate angular location of the rotary table thereof in successive predetermined stop positions by the expediency of a locating pin. To this end, reference is had to Figs. 5 and 6 which show a locating pin 110 in the upright frame section 16a in registry with one of several bushings 112 in the rear face 27a of the table 20a. The locating pin 110 is reciprocable in the frame section 16a for projection of its pilot head 114 into registry with and its retraction from an aligned bushing 112. The pilot head 114 of the locating pin 110 is presently frusto-conical and provided with tapering flats 116 on its opposite sides which on the forward projection of the pin 110 fittedly engage similarly tapering opposite side walls 118 of an elongated slot 120 in the aligned bushing 112. The locating pin 110 is projected forwardly into registry with an aligned bushing 112 in the table 20a preferably while the latter is airfloated (Fig. 5), thereby causing the table to respond to the advancing locating pin into being nudged thereby into its accurate angular position without practically any resistance from the table and, hence, without any appreciable wear of the locating pin 110 or bushings 112 for the longest time. The locating pin 110 is arranged on the upright section 16a of the frame 12a preferably vertically above the reference axis of the latter, so that the registering locating pin will have no tendency to shift the table out of its accurately located angular position on the termination of its air float and its ensuing gravitation into seating engagement with its bearing surface. Furthermore, the locating pin 110 is preferably yieldingly urged into registry with any aligned bushing 112 so as to be yieldable when on termination of the air float of the table the latter is firmly clamped to the backing surface 18a.

Reference is now had to Fig. 7 which shows a modified indexing fixture 10b that may in all respects be like the described indexing fixture 10, except that the present fixture 10b has a bearing support 14b which in its arcuate extent is considerably less than half the peripheral extent of the table 20b. This reduction, more or less, of the arcuate extent of the bearing support, unless non-permissible by considerations of the work to be indexed and/or the operations to be performed thereon, is not only entirely feasible due to the great lifting power of the air-float over even a relatively small area, but secures such advantages as reduced cost of the fixture and reduction of its bulk, as well as economy in the consumption of purchased compressed air for the air-float of the table.

Reference is now had to Fig. 8 which shows a modified indexing fixture 10c that may in all respects be like the described indexing fixture 10, except that the orifices 96c in the backing surface 18c of the frame 12c are arranged in diametrically opposite upper and lower sets 130 and 132 of which adjacent orifices in either set are far more closely spaced from each other than adjacent orifices of both sets. In so arranging the orifices 96c in the two sets, a minimum overall number of these orifices will serve to supply with compressed air an air film between the rear face of the table 20c and the backing surface 18c at those minimum areas thereof at which the air film will most directly counteract the tilting tendencies of the table with its lop-sided work load, with ensuing economy in the consumption of purchased compressed air for the air-float of the table. Furthermore, the forward and downward tilting tendency of the table 20c requires direct counteraction by the air film which is supplied with compressed air from the orifices of the lower set 132, thereby permitting the use of fewer orifices in the upper set 130 than in the lower set 132, as shown. Finally, the fewer orifices in the upper set 130 may be spaced farther apart than the more numerous orifices in the lower set 132, also as shown.

Reference is now had to Fig. 9 which shows another modified indexing fixture 10d that may in all respects be like the described indexing fixture 10, except that the backing surface 18d of the frame 12d is provided with a substantially horizontally extending vent groove 140 between upper and lower sets of orifices 96d. The vent groove 140 divides the backing surface 18d into upper and lower areas with the air film on either acting independently of the air film on the other in assuredly floating the table thereon during its indexing.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A workholder, comprising a fixed support having a bearing surface part-circular about a non-vertical axis; a table with a rotary axis having opposite faces normal to the latter with provisions on one face for releasably carrying a work load directly on said one face, and a peripheral surface arcuate about said rotary axis turnable and axially slidable on said bearing surface and normally seated thereon by gravity to center said table; a fixed member having a backing surface against and from which said table is axially slidable on said bearing surface with the other face of said table confronting and engageable with and disengageable from said backing surface, said support and member having orifices leading to said bearing and backing surfaces, respectively, and adapted to conduct compressed air thereat for air-floating said table on said bearing and backing surfaces, and said bearing surface being of limited circular extent for lateral removability of said table therefrom; means permitting rotation of said table but limiting axial motion of the same from said backing surface to sustain its air-float thereon; and means for releasably holding said table in uniform engagement with said backing surface.

2. A workholder, comprising a fixed support having a bearing surface part-circular about a substantially horizontal axis; a table with a rotary axis having opposite faces normal to the latter with provisions on one face for releasably carrying a work load directly on said one face, and a peripheral surface arcuate about said rotary axis turnable and axially slidable on said bearing surface and normally seated thereon by gravity to center said table; a fixed member having a backing surface against and from which said table is axially slidable on said bearing surface with the other face of said table confronting and engageable with and disengageable from said backing surface, said support and member having orifices leading to said bearing and backing surfaces, respectively, and adapted to conduct compressed air thereat for air-floating said table on said bearing and backing surfaces, and said bearing surface being of limited circular extent for lateral removability of said table therefrom; a device permitting rotation of said table but limiting axial motion of the same from said backing surface to sustain its air-float thereon; and means for releasably holding said table in uniform engagement with said backing surface.

3. A workholder as set forth in claim 2, in which said orifices in said member are arranged about said rotary table axis and are angularly spaced from each other closer below said rotary table axis than above the latter.

4. A workholder as set forth in claim 2, in which said backing surface is provided at the front of said member, and said device comprises a roller-type thrust bearing in back of said member having races of which one race bears against said member, and a rod carried by the other race and extending forwardly through said table with clearance therefrom and having at its forward end a collar engageable by said table with said one face thereof.

5. A workholder, comprising a fixed support having a bearing surface part-circular about a substantially horizontal axis; a table with a rotary axis having opposite faces normal to the latter with provisions on one face for releasably carrying a work load directly on said one face, and an annular periphery about said rotary axis turnable and axially slidable on said bearing surface and normally seated thereon by gravity to center said table; a fixed member having a backing surface against and from which said table is axially slidable on said bearing surface with the other face of said table confronting and engageable with and disengageable from said backing surface, said support and member having orifices leading to said bearing and backing surfaces, respectively, and adapted to conduct compressed air thereat for air-floating said table on said surfaces, and said bearing surface being of limited circular extent for lateral removability of said table therefrom; a device permitting rotation of said table but limiting axial motion of the same from said backing surface to sustain its air-float thereon; and means for releasably holding said table in uniform engagement with said backing surface.

6. A workholder as set forth in claim 5, in which said bearing surface is of less than semicircular extent.

References Cited in the file of this patent

UNITED STATES PATENTS

| | | |
|---|---|---|
| 1,274,074 | O'Brien | July 30, 1918 |
| 1,344,385 | Crays | June 22, 1920 |
| 1,471,992 | Wigness et al. | Oct. 23, 1923 |
| 1,956,883 | Verderber | May 1, 1934 |
| 2,640,400 | Verderber | June 2, 1953 |
| 2,756,115 | Michel | July 24, 1956 |